United States Patent
Yamamoto et al.

(10) Patent No.: US 12,269,400 B2
(45) Date of Patent: Apr. 8, 2025

(54) RELAY DEVICE, IN-VEHICLE COMMUNICATION SYSTEM, IN-VEHICLE COMMUNICATION METHOD, AND STORAGE MEDIUM

(71) Applicants: Sumitomo Electric Industries, Ltd., Osaka (JP); Sumitomo Wiring Systems, Ltd., Yokkaichi (JP); Autonetworks Technologies, Ltd., Yokkaichi (JP)

(72) Inventors: Yusuke Yamamoto, Osaka (JP); Hideyuki Tanaka, Osaka (JP); Tatsuya Izumi, Osaka (JP); Takeshi Hagihara, Yokkaichi (JP); Darmawan Go, Yokkaichi (JP)

(73) Assignees: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD, Yokkaichi (JP)

( * ) Notice: Subject to any disclaimer, the term of this patent is extended or adjusted under 35 U.S.C. 154(b) by 355 days.

(21) Appl. No.: 17/770,064

(22) PCT Filed: Sep. 10, 2020

(86) PCT No.: PCT/JP2020/034282
§ 371 (c)(1),
(2) Date: Apr. 19, 2022

(87) PCT Pub. No.: WO2021/084927
PCT Pub. Date: May 6, 2021

(65) Prior Publication Data
US 2022/0355750 A1    Nov. 10, 2022

(30) Foreign Application Priority Data

Oct. 28, 2019 (JP) ................................. 2019-195322

(51) Int. Cl.
*B60R 16/023* (2006.01)
*H04L 67/12* (2022.01)
*H04L 67/51* (2022.01)

(52) U.S. Cl.
CPC .......... *B60R 16/0231* (2013.01); *H04L 67/12* (2013.01); *H04L 67/51* (2022.05)

(58) Field of Classification Search
CPC ..... B60R 16/0231; H04L 67/12; H04L 67/51; H04L 67/565; H04L 12/28
See application file for complete search history.

(56) References Cited

U.S. PATENT DOCUMENTS

2010/0215043 A1*  8/2010  Hisada .................... H04L 12/40
                                                         370/392
2013/0136117 A1    5/2013  Schrum, Jr. et al.
(Continued)

FOREIGN PATENT DOCUMENTS

JP      2019-9559 A      1/2019
WO    2018/127790 A2    7/2018

OTHER PUBLICATIONS

Non-Final Office Action mailed Jun. 10, 2024, issued for the co-pending U.S. Appl. No. 17/770,062, 42 pages.
(Continued)

*Primary Examiner* — Chae S Lee
(74) *Attorney, Agent, or Firm* — XSENSUS LLP

(57) ABSTRACT

Provided is a relay device including: a relay unit configured to perform a relay process for a frame transmitted and received between the function units; and a relay management unit. The relay unit receives, from a function unit, a target frame which is transmitted and received according to
(Continued)

a predetermined communication protocol and includes information with which a request source of a service is identifiable and information with which a content of the requested service is identifiable, duplicates target data which is at least a part of the received target frame, outputs the duplicated target data to the relay management unit, and relays the received target frame to another function unit. The relay management unit performs determination regarding setting change in the relay process of the relay unit, on the basis of the target data received from the relay unit.

12 Claims, 11 Drawing Sheets

(56) References Cited

U.S. PATENT DOCUMENTS

| | | | |
|---|---|---|---|
| 2014/0068099 A1 | 3/2014 | Komori | |
| 2016/0344601 A1* | 11/2016 | Kaku | H04L 1/0061 |
| 2017/0214606 A1* | 7/2017 | Park | H04L 45/24 |
| 2018/0103108 A1 | 4/2018 | Kim et al. | |
| 2019/0239221 A1 | 8/2019 | Ujiie et al. | |
| 2019/0334897 A1 | 10/2019 | Anzai et al. | |
| 2020/0145252 A1* | 5/2020 | Torisaki | H04W 4/40 |
| 2020/0211301 A1 | 7/2020 | Zhang et al. | |
| 2020/0220838 A1 | 7/2020 | Ogawa et al. | |
| 2020/0304532 A1 | 9/2020 | Haga et al. | |
| 2020/0389469 A1* | 12/2020 | Litichever | H04W 4/40 |
| 2021/0075800 A1 | 3/2021 | Paraskevas et al. | |
| 2021/0157573 A1 | 5/2021 | Abe et al. | |
| 2021/0258187 A1 | 8/2021 | Wada et al. | |
| 2022/0131842 A1 | 4/2022 | Zhang et al. | |

OTHER PUBLICATIONS

English translation of US co-pending US National Phase application of PCT/JP2020/034302.

English translation of US co-pending US National Phase application of PCT/JP2020/034306.

U.S. Office Action issued Feb. 9, 2023 in U.S. Appl. No. 17/770,060, 19 pages.

U.S. Notice of Allowance issued Jul. 18, 2023 in U.S. Appl. No. 17/770,060, 7 pages.

Notice of Allowance dated Nov. 19, 2024, issued for the co-pending U.S. Appl. No. 17/770,062, total 17 pages.

* cited by examiner

FIG. 3

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Type | | | | | | | | Index 1st options | | | | | | | | Index 2nd options | | | | | | | | # of opt 1 | | | | # of opt 2 | | | |
| Service ID | | | | | | | | | | | | | | | | Instance ID | | | | | | | | | | | | | | | |
| Major Version | | | | | | | | Initial Data Requested Flag | Reserved2 | | | | | | | TTL | | | | | | | | | | | | | | | |
| Reserved | | | | | | | | | | | | | | | | Counter | | | | | | | | | | | | | | | |
| Eventgroup ID | | | | | | | | | | | | | | | | | | | | | | | | | | | | | | | |

FIG. 5

| COMMUNICATION PORT | MAC ADDRESS |
|---|---|
| COMMUNICATION PORT 13A | MAC-A |
| COMMUNICATION PORT 13B | MAC-B |
| COMMUNICATION PORT 13C | MAC-C |
| COMMUNICATION PORT 13D | MAC-D |

FIG. 6

| TRANSMISSION SOURCE COMMUNICATION PORT | TRANSMISSION DESTINATION COMMUNICATION PORT | SHAPING RATE [Mbps] |
|---|---|---|
| COMMUNICATION PORT 13A | COMMUNICATION PORT 13B | 31 |
| COMMUNICATION PORT 13A | COMMUNICATION PORT 13C | 1 |
| COMMUNICATION PORT 13B | COMMUNICATION PORT 13A | 1 |
| COMMUNICATION PORT 13B | COMMUNICATION PORT 13C | 1 |
| COMMUNICATION PORT 13C | COMMUNICATION PORT 13A | 1 |
| COMMUNICATION PORT 13C | COMMUNICATION PORT 13B | 1 |

FIG. 7

| TRANSMISSION SOURCE COMMUNICATION PORT | TRANSMISSION DESTINATION COMMUNICATION PORT | SHAPING RATE [Mbps] |
|---|---|---|
| COMMUNICATION PORT 13A | COMMUNICATION PORT 13B | 31 |
| COMMUNICATION PORT 13A | COMMUNICATION PORT 13C | 31 |
| COMMUNICATION PORT 13B | COMMUNICATION PORT 13A | 1 |
| COMMUNICATION PORT 13B | COMMUNICATION PORT 13C | 1 |
| COMMUNICATION PORT 13C | COMMUNICATION PORT 13A | 1 |
| COMMUNICATION PORT 13C | COMMUNICATION PORT 13B | 1 |

RELAY DEVICE, IN-VEHICLE COMMUNICATION SYSTEM, IN-VEHICLE COMMUNICATION METHOD, AND STORAGE MEDIUM

CROSS-REFERENCE TO RELATED APPLICATIONS

The present application is based on PCT/JP2020/034282, filed on Sep. 10, 2020, which claims priority to Japanese Application No. 2019-195322, filed on Oct. 28, 2019. This application is also related to U.S. patent application Ser. No. 17/770,060, entitled: RELAY DEVICE, IN-VEHICLE COMMUNICATION SYSTEM, VEHICLE, AND IN-VEHICLE COMMUNICATION METHOD, filed Apr. 19, 2022 and U.S. patent application Ser. No. 17/770,062, entitled: RELAY DEVICE, IN-VEHICLE COMMUNICATION SYSTEM, VEHICLE, AND IN-VEHICLE COMMUNICATION METHOD, filed Apr. 19, 2022. The entire contents of each are incorporated herein by reference.

TECHNICAL FIELD

The present disclosure relates to a relay device, an in-vehicle communication system, a vehicle, and an in-vehicle communication method.

BACKGROUND ART

PATENT LITERATURE 1 (Japanese Laid-Open Patent Publication No. 2019-9559) discloses a server as follows. That is, the server is a server (20) which is applied to a communication system (10) using a TCP/IP communication protocol, and provides services to clients (40 to 44, 50 to 54) according to subscription requests of the clients. The server (20) includes: a table storage unit (30) configured to store therein a priority table (32) in which, for each service, a priority level in receiving the service is set in association with each client; and a service determination unit (26, S400 to S410) configured to, when a client requests subscription of a service, determine whether or not to permit the service subscription request from the client on the basis of the priority table stored in the table storage unit.

CITATION LIST

Patent Literature

PATENT LITERATURE 1: Japanese Laid-Open Patent Publication No. 2019-9559

SUMMARY OF THE INVENTION

A relay device according to the present disclosure is used in an in-vehicle network including a plurality of function units, and includes: a relay unit configured to perform a relay process for a frame transmitted and received between the function units; and a relay management unit. The relay unit receives, from a function unit, a target frame which is transmitted and received according to a predetermined communication protocol and includes information with which a request source of a service is identifiable and information with which a content of the requested service is identifiable, duplicates target data which is at least a part of the received target frame, outputs the duplicated target data to the relay management unit, and relays the received target frame to another function unit. The relay management unit performs determination regarding setting change in the relay process of the relay unit, on the basis of the target data received from the relay unit.

An in-vehicle communication system according to the present disclosure includes a plurality of function units, and a relay device. The relay device performs a relay process for a frame transmitted and received between the function units. Each function unit transmits, to the relay device, a target frame which is transmitted and received according to a predetermined communication protocol and includes information with which a request source of a service is identifiable and information with which a content of the requested service is identifiable. The relay device receives the target frame from the function unit, relays the received target frame to another function unit, and performs determination regarding setting change in the relay process, on the basis of the information included in the received target frame.

An in-vehicle communication method according to the present disclosure is performed by a relay device used in an in-vehicle network including a plurality of function units, and the method includes: performing a relay process for a frame transmitted and received between the function units; and performing determination regarding setting change in the relay process. In performing the relay process for the frame, a target frame, which is transmitted and received according to a predetermined communication protocol and includes information with which a request source of a service is identifiable and information with which a content of the requested service is identifiable, is received from a function unit, and the received target frame is relayed to another function unit. In performing the determination regarding the setting change, the determination regarding the setting change in the relay process is performed on the basis of the information included in the received target frame.

One mode of the present disclosure can be realized not only as a relay device including such characteristic processing units, but also as a semiconductor integrated circuit that realizes a part or the entirety of the relay device or as a program that causes a computer to execute process steps in the relay device. Moreover, one mode of the present disclosure can be realized not only as an in-vehicle communication system including such characteristic processing units, but also as a method that has such characteristic process steps, as a semiconductor integrated circuit that realizes a part or the entirety of the in-vehicle communication system, or as a program that causes a computer to execute process steps in the in-vehicle communication system.

BRIEF DESCRIPTION OF DRAWINGS

FIG. 3 shows an example of a frame transmitted and received by in-vehicle ECUs according to the embodiment of the present disclosure.

FIG. 5 shows an example of an address table in a storage unit of the relay device according to the embodiment of the present disclosure.

FIG. 6 shows an example of a setting table in the storage unit of the relay device according to the embodiment of the present disclosure.

FIG. 7 shows another example of a setting table in the storage unit of the relay device according to the embodiment of the present disclosure.

DETAILED DESCRIPTION

Figure 1:
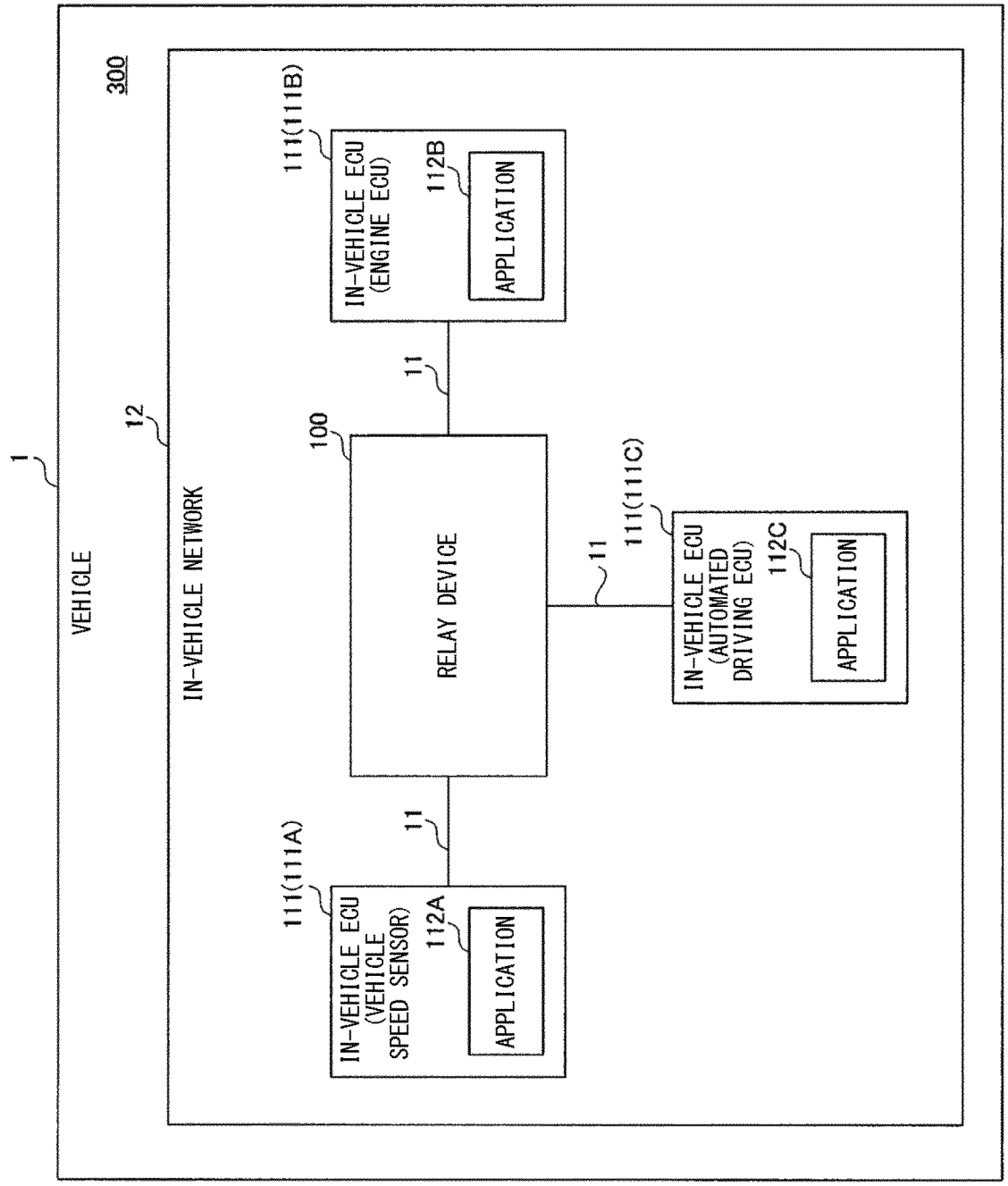
FIG. 1 shows a configuration of an in-vehicle communication system according to an embodiment of the present disclosure.

In recent years, introduction of service-oriented communication into an in-vehicle network has been promoted.

Problems to be Solved by the Present Disclosure

In the conventional art described in PATENT LITERATURE 1, further improvement is desired in terms of efficiency of a frame relay process. Beyond the conventional art, a technology capable of more efficiently performing a relay process in an in-vehicle network is desired.

The present disclosure has been made in order to solve the above problem. An object of the present disclosure is to provide a relay device, an in-vehicle communication system, a vehicle, and an in-vehicle communication method capable of more efficiently performing a relay process in an in-vehicle network.

Effects of the Present Disclosure

According to the present disclosure, a relay process in an in-vehicle network can be performed more efficiently.

DESCRIPTION OF EMBODIMENT OF THE PRESENT DISCLOSURE

First, the contents of an embodiment of the present disclosure are listed and described.

(1) A relay device according to an embodiment of the present disclosure is used in an in-vehicle network including a plurality of function units, and includes: a relay unit configured to perform a relay process for a frame transmitted and received between the function units; and a relay management unit. The relay unit receives, from a function unit, a target frame which is transmitted and received according to a predetermined communication protocol and includes information with which a request source of a service is identifiable and information with which a content of the requested service is identifiable, duplicates target data which is at least a part of the received target frame, outputs the duplicated target data to the relay management unit, and relays the received target frame to another function unit. The relay management unit performs determination regarding setting change in the relay process of the relay unit, on the basis of the target data received from the relay unit.

As described above, according to the configuration for performing determination regarding setting change in the relay process on the basis of the information included in the target frame, determination regarding setting change in the relay process for a frame between the function units can be performed according to the status of service-oriented communication between the function units, for example. Thus, it is possible to efficiently relay a frame transmitted and received between a function unit as a provision source of a service and a function unit as a provision destination of the service, for example. Therefore, the relay process in the in-vehicle network can be performed more efficiently.

(2) Preferably, the relay unit outputs, to the relay management unit, port information indicating a communication port through which the received target frame has been passed, among a plurality of communication ports included in the relay device, and the relay management unit performs the determination regarding the setting change further on the basis of the port information received from the relay unit.

With the above configuration, if the reception frequency of a frame received from a certain function unit via a corresponding communication port is equal to or higher than a predetermined value, the relay management unit can determine to stop reception or relay of the frame from the function unit, as determination regarding setting change. Thus, for example, reception or relay of an unauthorized frame from a function unit subjected to an unauthorized access can be stopped, thereby improving security in the in-vehicle network.

(3) Preferably, the relay management unit performs the determination regarding the setting change, on the basis of information regarding a function unit as a provision source of the service related to the target frame or information regarding a function unit as a provision destination of the service related to the target frame.

With the above configuration, on the basis of a communication band according to the amount of data to be transmitted from the function unit as the service provision source to the function unit as the service provision destination, the relay management unit can perform determination regarding setting change in the communication band between the function unit as the provision source and the function unit as the provision destination.

(4) Preferably, the relay management unit performs the determination regarding the setting change, on the basis of a content of information for starting provision of a service related to the target frame.

With the above configuration, the relay management unit can determine whether or not setting change in the communication band between the function unit as the provision source and the function unit as the provision destination is necessary, in accordance with start of service-oriented communication between the function units.

(5) Preferably, the relay management unit performs detection for abnormality of the target frame, and performs the determination regarding the setting change on the basis of a result of the detection.

With the above configuration, for example, the relay management unit can determine to stop relay of a frame between function units, on the basis of the result of the detection of abnormality in the target frame.

(6) Preferably, the relay management unit performs the determination regarding the setting change, on the basis of the content of a header of the target frame transmitted and received according to SOME/IP as a communication protocol.

With the above configuration, the relay process can be performed more efficiently between function units that perform service-oriented communication according to SOME/IP as a communication protocol.

(7) Preferably, the relay management unit determines the content of the setting change and notifies the relay unit of the determined content, and the relay unit performs setting change in the relay process, according to the determined content notified from the relay management unit.

With the above configuration, for example, the setting change in the relay device can be dynamically performed according to information included in the target frame, whereby the relay process in the in-vehicle network can be performed more efficiently.

(8) More preferably, the relay device further includes a storage unit configured to store therein the determined content in a non-volatile manner, and the relay unit performs the setting change in the relay process, according to the determined content in the storage unit when the relay device is started up.

With the above configuration, when the relay device is restarted, a stable relay process can be performed early, according to the determined content stored in the storage unit.

(9) Preferably, the relay management unit notifies at least one of a function unit as a provision source of the service related to the target frame and a function unit as a provision destination of the service related to the target frame, of information based on a result of the determination regarding the setting change, via the relay unit.

With the above configuration, it is possible to request the function unit to change the frequency, the amount of data, or the like of data transmission between function units, on the basis of the result of the determination regarding the setting change.

(10) An in-vehicle communication system according to the embodiment of the present disclosure includes a plurality of function units, and a relay device. The relay device performs a relay process for a frame transmitted and received between the function units. Each function unit transmits, to the relay device, a target frame which is transmitted and received according to a predetermined communication protocol and includes information with which a request source of a service is identifiable and information with which a content of the requested service is identifiable. The relay device receives the target frame from the function unit, relays the received target frame to another function unit, and performs determination regarding setting change in the relay process, on the basis of the information included in the received target frame.

As described above, according to the configuration for performing determination regarding setting change in the relay process on the basis of the information included in the target frame, determination regarding setting change in the relay process for a frame between the function units can be performed according to the status of service-oriented communication between the function units, for example. Thus, it is possible to efficiently relay a frame transmitted and received between a function unit as a provision source of a service and a function unit as a provision destination of the service, for example. Therefore, the relay process in the in-vehicle network can be performed more efficiently.

(11) A vehicle according to the embodiment of the present disclosure includes the in-vehicle communication system.

With the above configuration, in the vehicle including the in-vehicle communication system, the relay process in the in-vehicle network can be performed more efficiently.

(12) An in-vehicle communication method according to the embodiment of the present disclosure is performed by a relay device used in an in-vehicle network including a plurality of function units, and the method includes: performing a relay process for a frame transmitted and received between the function units; and performing determination regarding setting change in the relay process. In performing the relay process for the frame, a target frame, which is transmitted and received according to a predetermined communication protocol and includes information with which a request source of a service is identifiable and information with which a content of the requested service is identifiable, is received from a function unit, and the received target frame is relayed to another function unit. In performing the determination regarding the setting change, the determination regarding the setting change in the relay process is performed on the basis of the information included in the received target frame.

As described above, according to the method for performing determination regarding setting change in the relay process on the basis of the information included in the target frame, determination regarding setting change in the relay process for a frame between the function units can be performed according to the status of service-oriented communication between the function units, for example. Thus, it is possible to efficiently relay a frame transmitted and received between a function unit as a provision source of a service and a function unit as a provision destination of the service, for example. Therefore, the relay process in the in-vehicle network can be performed more efficiently.

Hereinafter, an embodiment of the present disclosure will be described in detail with reference to the drawings. In the drawings, the same or corresponding parts are denoted by the same reference signs, and description thereof is not repeated. At least some parts of the embodiments described below can be combined together as desired.

[In-Vehicle Communication System]

FIG. 1 shows a configuration of an in-vehicle communication system according to an embodiment of the present disclosure.

With reference to FIG. 1, an in-vehicle communication system 300 includes a plurality of in-vehicle ECUs (Electronic Control Units) 111, and a relay device 100. Specifically, the in-vehicle communication system 300 includes in-vehicle ECUs 111A to 111C as the in-vehicle ECUs 111. The in-vehicle communication system 300 is installed in a vehicle 1. The in-vehicle ECUs 111 and the relay device 100 constitute an in-vehicle network 12. The relay device 100 is used in the in-vehicle network 12 including the plurality of in-vehicle ECUs 111.

The in-vehicle ECU 111A includes an application 112A. The in-vehicle ECU 111B includes an application 112B. The in-vehicle ECU 111C includes an application 112C. Hereinafter, each of the applications 112A, 112B, and 112C is also referred to as an application 112.

The in-vehicle ECUs 111 and the applications 112 are examples of function units in the in-vehicle network 12.

In the in-vehicle network 12, the in-vehicle ECUs 111 are connected to the relay device 100 via Ethernet (registered trademark) cables 11, for example.

The in-vehicle communication system 300 may not necessarily include three in-vehicle ECUs 111, and may include two, four, or more in-vehicle ECUs 111. The in-vehicle communication system 300 may not necessarily be configured such that one application 112 is installed in one in-vehicle ECU 111, and may be configured such that two or more applications 112 are installed in one in-vehicle ECU 111.

The in-vehicle communication system 300 may not necessarily include one relay device 100, and may include two or more relay devices 100.

The relay device 100 is, for example, a gateway device, and can relay data between a plurality of in-vehicle ECUs 111 connected thereto. The relay device 100 can perform a relay process in accordance with, for example, a layer 2, and a layer 3 of a higher order than the layer 2. For example, the relay device 100 performs a relay process for a frame between in-vehicle ECUs 111 belonging to the same VLAN, and a relay process for a frame between in-vehicle ECUs 111 belonging to different VLANs.

More specifically, the relay device 100 performs a relay process for a frame to be exchanged between the in-vehicle ECUs 111 connected thereto via the Ethernet cables 11, in accordance with an Ethernet communication standard, for example. Hereinafter, a frame conforming to the Ethernet communication standard is referred to as "Ethernet frame". An IP packet is stored in the Ethernet frame.

The in-vehicle communication system 300 may not necessarily be configured to perform relay of an Ethernet frame in accordance with the Ethernet communication standard, and may be configured to perform relay of data in accordance with another communication standard such as CAN (Controller Area Network), FlexRay (registered trademark), MOST (Media Oriented Systems Transport) (registered trademark), or LIN (Local Interconnect Network), for example.

Examples of the in-vehicle ECUs 111 include an automated driving ECU, an engine ECU, a sensor, a navigation device, a human-machine interface, and a camera.

In this example, the in-vehicle ECUs 111A, 111B, and 111C are a vehicle speed sensor, an engine ECU, and an automated driving ECU, respectively.

Hereinafter, the in-vehicle ECUs 111A, 111B, and 111C are also referred to as a vehicle speed sensor 111A, an engine ECU 111B, and an automated driving ECU 111C, respectively.

Each application 112 performs, for example, a process for an application layer, thereby performing a predetermined process in the in-vehicle ECU 111 in which the application 112 is installed. For example, the application 112A in the vehicle speed sensor 111A generates, in a predetermined cycle, speed information indicating a traveling speed of the vehicle 1.

For example, the vehicle speed sensor 111A periodically or non-periodically adds the speed information indicating the speed of the vehicle 1, to a frame, and transmits the frame to another in-vehicle ECU 111.

The engine ECU 111B receives the speed information from the in-vehicle ECU 111A via the relay device 100, and controls the engine on the basis of the received speed information, and the like.

The automated driving ECU 111C receives the speed information from the in-vehicle ECU 111A via the relay device 100, and performs automated driving control of the vehicle 1 on the basis of the received speed information, and the like.

That is, the vehicle speed sensor 111A is a server ECU that provides a service of notifying the speed information. Meanwhile, the engine ECU 111B and the automated driving ECU 111C are client ECUs that receive the service provided from the vehicle speed sensor 111A.

[Communication Connection Between Function Units]

Each function unit transmits and receives a frame conforming to a predetermined protocol. For example, each in-vehicle ECU 111 transmits and receives a frame conforming to SOME/IP (Scalable Service-Oriented Middleware on Ethernet/Internet Protocol).

Figure 2:
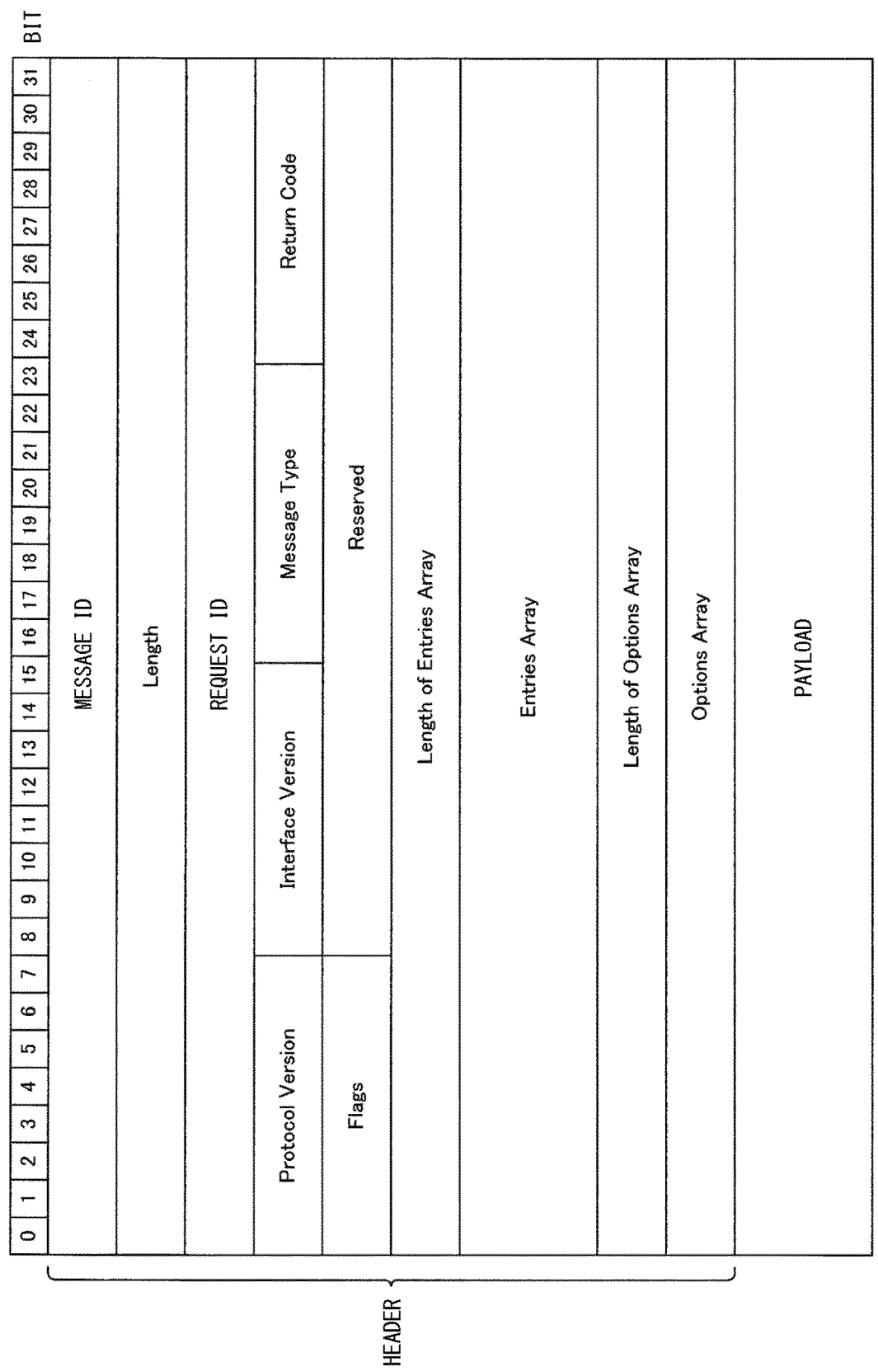
FIG. 2 shows an example of a frame transmitted and received by in-vehicle ECUs according to the embodiment of the present disclosure.

FIG. 2 shows an example of a frame transmitted and received by the in-vehicle ECUs according to the embodiment of the present disclosure. FIG. 2 shows an example of a frame that conforms to SOME/IP and is transmitted and received between the in-vehicle ECUs 111.

With reference to FIG. 2, a header of the frame conforming to SOME/IP includes fields of Message ID, Length, Request ID, Protocol Version, Interface Version, Message Type, Return Code, Flags, Reserve, Length of Entries Array, Entries Array, Length of Options Array, and Options Array.

FIG. 3 shows an example of a frame transmitted and received by the in-vehicle ECUs according to the embodiment of the present disclosure. FIG. 3 shows in more detail the field of Entries Array in the frame shown in FIG. 2.

With reference to FIG. 3, the field of Entries Array in the frame conforming to SOME/IP includes fields of Type, Index 1st options, Index 2nd options, # of opt 1, # of opt 2, Service ID, Instance ID, Major Version, TTL (Time To Live), Reserve, Initial Data Requested Flag, Reserve2, Counter, and Eventgroup ID.

The in-vehicle ECU 111 transmits and receives, via the relay device 100, a communication setting frame which is a frame conforming to SOME/IP and used for establishing communication connection with another in-vehicle ECU 111.

When the in-vehicle ECU 111 has established communication connection with another in-vehicle ECU 111 by transmitting and receiving the communication setting frame via the relay device 100, the in-vehicle ECU 111 communicates with the other in-vehicle ECU 111 by using the frame conforming to SOME/IP. For example, when a server ECU has established communication connection with a client ECU, the server ECU starts to provide a service to the client ECU by using the frame conforming to SOME/IP.

In the communication setting frame transmitted and received between the server ECU and the client ECU, information, with which the client ECU as a request source of the service is identifiable, is stored in the field of Request ID. More specifically, a MAC address of the client ECU is stored in the field of Request ID.

In the communication setting frame transmitted and received between the server ECU and the client ECU, information, with which the content of the service of the server ECU is identifiable, is stored in the field of Message ID. More specifically, information indicating the content of the service provided by the server ECU is stored in the field of the Message ID.

For example, when an automated driving ECU 111C, which is a client ECU, is newly added in the in-vehicle network 12 as a new in-vehicle ECU 111, the automated driving ECU 111C generates a service search frame which is an example of the communication setting frame and includes information indicating that the automated driving ECU 111C is currently searching for a server ECU capable of transmitting speed information. Then, the automated driving ECU 111C multicasts the generated service search frame to other in-vehicle ECUs 111 via the relay device 100.

The vehicle speed sensor 111A, which is a server ECU, receives the service search frame from the automated driving ECU 111C via the relay device 100, and generates a service provision notification frame which is an example of the communication setting frame and includes its own MAC address and information indicating that the vehicle speed sensor 111A can transmit the speed information. Then, the vehicle speed sensor 111A transmits the generated service provision notification frame to the automated driving ECU 111C via the relay device 100, as a response to the service search frame.

The automated driving ECU 111C receives the service provision notification frame from the vehicle speed sensor 111A via the relay device 100, and generates a service subscription request frame which is an example of the communication setting frame and includes its own ID and information indicating that the automated driving ECU 111C requests transmission of the speed information. Then, the automated driving ECU 111C transmits the generated service subscription request frame to the vehicle speed sensor 111A via the relay device 100.

The vehicle speed sensor 111A receives the service subscription request frame from the automated driving ECU 111C via the relay device 100, and determines, based on the ID of the automated driving ECU 111C, etc., included in the received service subscription request frame, whether or not to permit the automated driving ECU 111C to subscribe to the service, that is, whether or not to start transmission of the speed information to the automated driving ECU 111C.

Then, the vehicle speed sensor 111A generates a service subscription propriety frame which is an example of the communication setting frame and includes information indicating the content of the determination, and transmits the generated service subscription propriety frame to the automated driving ECU 111C via the relay device 100, as a response to the service subscription request frame.

When the vehicle speed sensor 111A has determined to start provision of the service to the automated driving ECU 111C, the vehicle speed sensor 111A periodically or non-periodically transmits a service provision frame, which is a frame conforming to SOME/IP and used for providing a service, to the automated driving ECU 111C via the relay device 100. More specifically, the vehicle speed sensor 111A periodically or non-periodically transmits the service provision frame including the speed information to the automated driving ECU 111C via the relay device 100.

[Relay Device]

Figure 4:
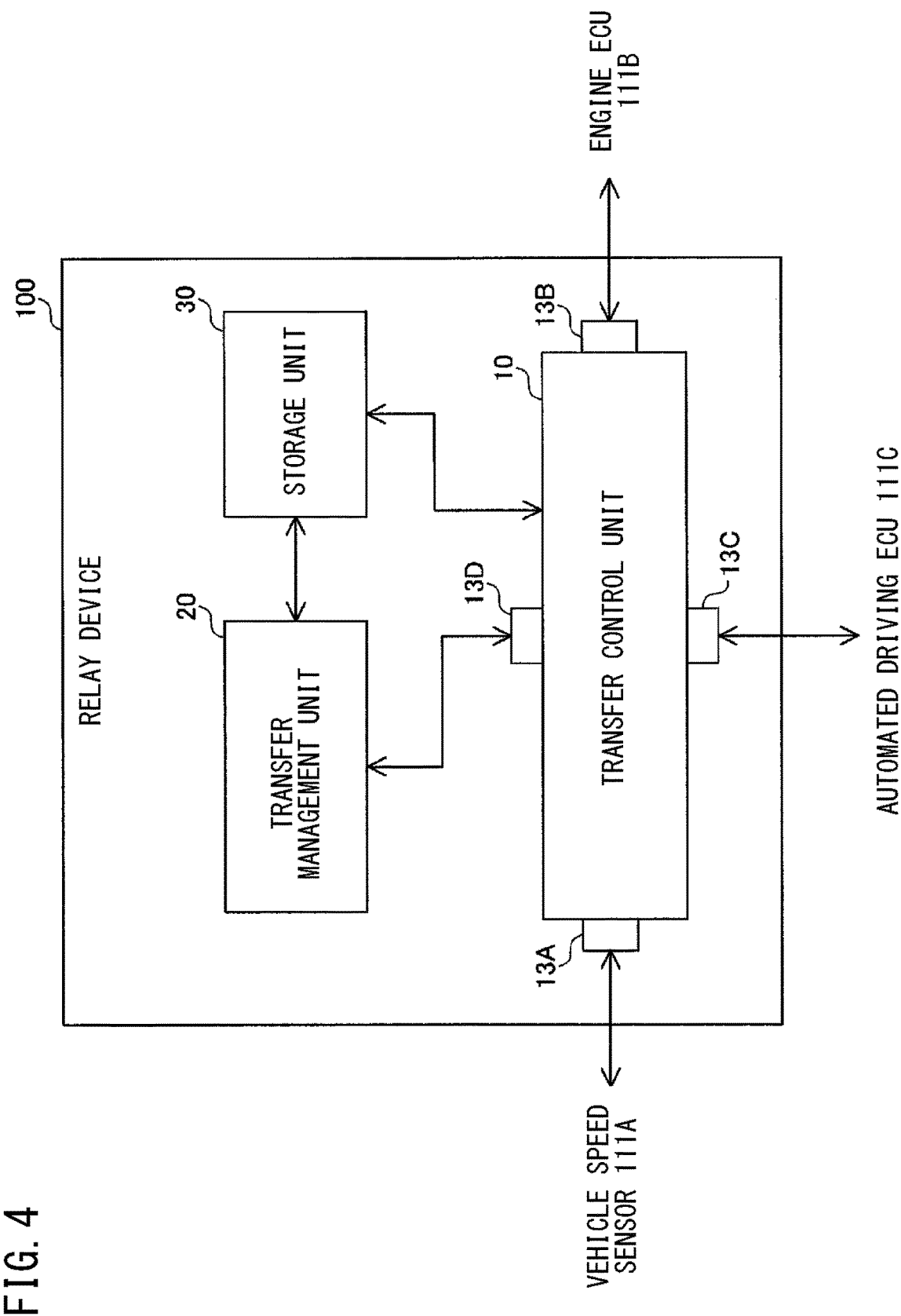
FIG. 4 shows an example of a configuration of a relay device according to the embodiment of the present disclosure.

FIG. 4 shows an example of the configuration of the relay device according to the embodiment of the present disclosure.

With reference to FIG. 4, the relay device 100 includes a transfer control unit 10, a transfer management unit 20, and a storage unit 30. The transfer control unit 10 includes communication ports 13A, 13B, 13C, and 13D. The transfer control unit 10 is an example of a relay unit. The transfer management unit 20 is an example of a relay management unit.

The transfer control unit 10 is implemented by a semiconductor integrated circuit, for example. The transfer management unit 20 is implemented by a processor such as a CPU (Central Processing Unit) or a DSP (Digital Signal Processor), for example. The storage unit 30 is a flash memory, for example.

The communication ports 13A, 13B, 13C, and 13D are input/output ports, for example. Hereinafter, each of the communication ports 13A, 13B, 13C, and 13D is also referred to as a communication port 13.

In the example shown in FIG. 1 and FIG. 4, the vehicle speed sensor 111A is connected to the communication port 13A via a wiring pattern and the Ethernet cable 11, the engine ECU 111B is connected to the communication port 13B via a wiring pattern and the Ethernet cable 11, the automated driving ECU 111C is connected to the communication port 13C via a wiring pattern and the Ethernet cable 11, and the transfer management unit 20 is connected to the communication port 13D via a wiring pattern. The communication ports 13A, 13B, and 13C may be external connectors or the like of the relay device 100.

[Transfer Control Unit]

The transfer control unit 10 performs a relay process for frames transmitted and received between the function units. More specifically, the transfer control unit 10 receives, from an in-vehicle ECU 111, a frame addressed to another in-vehicle ECU 111 via a corresponding communication port 13, and transmits the frame to the other in-vehicle ECU 111 via the corresponding communication port.

For example, the storage unit 30 has, stored therein, an address table in which each communication port 13 is associated with a MAC address of a device connected via the communication port 13.

FIG. 5 shows an example of the address table stored in the storage unit of the relay device according to the embodiment of the present disclosure.

With reference to FIG. 5, in the address table, for example, the vehicle speed sensor 111A has a MAC address of "MAC-A", the engine ECU 111B has a MAC address of "MAC-B", the automated driving ECU 111C has a MAC address of "MAC-C", and the transfer management unit 20 as a MAC address of "MAC-D".

When the destination MAC address of a frame received from the vehicle speed sensor 111A via the communication port 13A is "MAC-B", the transfer control unit 10 transmits the frame to the engine ECU 111B via the communication port 13B corresponding to "MAC-B", according to the address table in the storage unit 30.

For example, the storage unit 30 has, stored therein, a setting table indicating shaping rates of frames, between the communication ports 13, subjected to a relay process in the transfer control unit 10.

FIG. 6 shows an example of the setting table in the storage unit of the relay device according to the embodiment of the present disclosure.

The transfer control unit 10 performs a relay process for frames transmitted and received between the in-vehicle ECUs 111, according to the setting table in the storage unit 30.

With reference to FIG. 6, for example, the transfer control unit 10 receives, from the vehicle speed sensor 111A, a frame addressed to the engine ECU 111B via the communication port 13A, and transmits the frame to the engine ECU 111B via the communication port 13B at the shaping rate of 31 Mbps, according to the setting table in the storage unit 30.

The transfer control unit 10 receives, from a function unit, a target frame that is transmitted and received according to a predetermined communication protocol and includes information with which a request source of a service is identifiable and information with which the content of the requested service is identifiable, duplicates target data which is at least a part of the received target frame, outputs the duplicated target data to the transfer management unit 20, and relays the received target frame to another function unit.

For example, the transfer control unit 10 selectively duplicates the target frame among received frames, relays the duplicated target frame to the other function unit, and outputs the duplicated target frame to the transfer management unit 20.

More specifically, the transfer control unit 10 receives, from the automated driving ECU 111C, a frame addressed to the vehicle speed sensor 111A via the communication port 13C, and confirms, for example, a port number in an UDP header of the received frame. If the port number of the frame matches a port number assigned in advance to a frame conforming to SOME/IP, the transfer control unit 10 determines that the received frame is a target frame. The transfer control unit 10 may be configured to determine whether or not a received frame is a target frame on the basis of the MAC address or IP address of the received frame.

Upon determining that the received frame is a target frame, the transfer control unit 10 adds "MAC-D" which is the MAC address of the transfer management unit 20, as a destination MAC address of the target frame. Then, the transfer control unit 10 transmits the target frame to the vehicle speed sensor 111A via the communication port 13A and outputs the target frame to the transfer management unit 20 via the communication port 13D, according to the address table in the storage unit 30.

Meanwhile, upon determining that the received frame is not a target frame, the transfer control unit 10 transmits the frame to the vehicle speed sensor 111A via the communication port 13A, according to the address table in the storage unit 30.

For example, the transfer control unit 10 outputs, to the transfer management unit 20, port information indicating a communication port 13 through which the received target frame has been passed, among the plurality of communication ports 13 in the relay device 100.

Specifically, upon determining that the frame, which has been received from the automated driving ECU 111C via the communication port 13C and is addressed to the vehicle speed sensor 111A, is a target frame, the transfer control unit 10 generates port information indicating that the target frame has been received via the communication port 13C, adds the generated port information to the target frame, and transmits the target frame to the transfer management unit 20.

[Transfer Management Unit]

The transfer management unit 20 performs determination regarding setting change in the relay process of the transfer control unit 10, on the basis of the information included in the target frame received from the transfer control unit 10. Specifically, the transfer management unit 20 performs, as determination regarding setting change, determination as to whether or not setting change is necessary and determination regarding the content of setting change.

More specifically, the transfer management unit 20 determines whether or not the target frame is a specific frame such as a communication setting frame or a service provision frame, on the basis of a message ID in the header of the target frame received from the transfer control unit 10.

Upon determining that the target frame received from the transfer control unit 10 is a specific frame, the transfer management unit 20 performs determination regarding setting change in the relay process of the transfer control unit 10 on the basis of the target frame.

For example, the transfer management unit 20 performs determination regarding setting change in the relay process of the transfer control unit 10, on the basis of the content of the header of the target frame transmitted and received according to SOME/IP as a communication protocol.

(First Example of Setting Change)

For example, the transfer management unit 20 performs determination regarding setting change in the relay process of the transfer control unit 10 on the basis of the content of information for starting provision of a service related to a communication setting frame.

More specifically, in the field of Type in Entries Array of a communication setting frame transmitted and received between in-vehicle ECUs 111, information for starting provision of a service related to the communication setting frame is stored.

For example, in the field of Type in a communication setting frame, e.g., a service subscription propriety frame, transmitted from a server ECU to a client ECU, information indicating whether or not the server ECU has permitted the client ECU to subscribe to the service, is stored.

The transfer management unit 20 confirms whether or not the server ECU has permitted the client ECU to subscribe to the service, on the basis of the information stored in the field of Type in the service subscription propriety frame received from the transfer control unit 10, and determines whether or not setting change in the relay process of the transfer control unit 10 is necessary, according to a result of the confirmation.

Specifically, upon receiving, from the transfer control unit 10, the service subscription propriety frame in which information indicating that the server ECU permits the client ECU to subscribe to the service is stored, the transfer management unit 20 determines that setting change in the relay process of the transfer control unit 10 is necessary. Meanwhile, upon receiving, from the transfer control unit 10, the service subscription propriety frame in which information indicating that the server ECU does not permit the client ECU to subscribe to the service is stored, the transfer management unit 20 determines that setting change in the relay process of the transfer control unit 10 is not necessary.

Moreover, for example, the transfer management unit 20 performs determination regarding setting change in the relay process of the transfer control unit 10, on the basis of information regarding a function unit as a provision source of the service related to the communication setting frame or information regarding a function unit as a provision destination of the service.

More specifically, on the basis of information stored in the field of Message ID in the communication setting frame received from the transfer control unit 10, the transfer management unit 20 specifies a communication band that is required in the transfer control unit 10 for performing a relay process of data to be transmitted and received between the server ECU and the client ECU after start of provision of the service from the server ECU to the client ECU.

Specifically, the transfer management unit 20 confirms the field of Message ID in the communication setting frame, e.g., the service subscription propriety frame, received from the transfer control unit 10.

When the transfer management unit 20 has recognized that provision of the service from the vehicle speed sensor 111A as the server ECU to the automated driving ECU 111C as the client ECU is started, on the basis of the Message ID in the service subscription propriety frame, the transfer management unit 20 specifies a communication band to be ensured in the transfer control unit 10 in order to perform a relay process for speed information that is transmitted from the vehicle speed sensor 111A and addressed to the automated driving ECU 111C.

For example, the storage unit 30 has, stored therein, necessary band information indicating a communication band to be ensured in order to perform a relay process of relaying a frame transmitted and received between a server ECU and a client ECU in accordance with provision of a service from the server ECU to the client ECU.

On the basis of the necessary band information in the storage unit 30, the transfer management unit 20 specifies a communication band to be ensured in the transfer control unit 10 in order to perform the relay process for the speed information transmitted from the vehicle speed sensor 111A and addressed to the automated driving ECU 111C.

For example, the transfer management unit 20 determines the content of setting change in the relay process of the transfer control unit 10, and notifies the transfer control unit 10 of the determined content.

The transfer control unit 10 performs setting change in the relay process in accordance with the determined content notified from the transfer management unit 20.

Specifically, as for the content of setting change in the relay process of the transfer control unit 10, the transfer management unit 20 determines to change the shaping rate at the time of relaying a frame from the communication port 13A to the communication port 13C, that is, determines to increase the shaping rate by 30 Mbps, and outputs, to the transfer control unit 10, determination information indicating that the shaping rate at the time of relaying a frame from the communication port 13A to the communication port 13C should be increased by 30 Mbps.

FIG. 7 shows another example of the setting table stored in the storage unit of the relay device according to the embodiment of the present disclosure.

With reference to FIG. 7, upon receiving the determination information from the transfer management unit 20, the transfer control unit 10, according to the received determination information, changes the shaping rate at the time of relaying a frame from the communication port 13A to the communication port 13C, to 31 Mbps on the setting table in the storage unit 30.

The transfer control unit 10 performs a relay process for a frame transmitted and received between the in-vehicle ECUs 111, according to the changed setting table in the storage unit 30.

The transfer control unit 10 updates the setting table stored in the storage unit 30 according to the determination information received from the transfer management unit 20, and therefore can perform setting change in the relay process, according to the determined content stored in the storage unit 30, when the relay device 100 is restarted next, that is, when the relay device 100 in the stopped state is started.

The transfer management unit 20 may be configured to determine the driving status of the vehicle 1 on the basis of the content of the information for starting provision of the service related to the communication setting frame, and perform determination regarding setting change in the relay process of the transfer control unit 10 on the basis of the result of the determination on the driving status of the vehicle 1.

More specifically, upon recognizing that provision of the service from the vehicle speed sensor 111A as the server ECU to the automated driving ECU 111C as the client ECU is started, the transfer management unit 20 determines that the driving status of the vehicle 1 is changed from manual driving to automated driving. Then, based on the determination result, the transfer management unit 20 changes the shaping rate at the time of relaying a frame from the communication port 13A to the communication port 13C, to a preset shaping rate in an automated driving mode. Thus, the setting change in the relay process being performed according to the driving status of the vehicle 1 enables more efficient relay of frames.

(Second Example of Setting Change)

For example, the transfer management unit 20 performs determination regarding setting change in the relay process of the transfer control unit 10, further based on port information received from the transfer control unit 10.

More specifically, on the basis of the port information received from the transfer control unit 10, the transfer management unit 20 confirms, for each communication port 13, reception frequency of a received target frame.

For example, when the reception frequency of a target frame via the communication port 13C is equal to or higher than a predetermined value, the transfer management unit 20 determines to stop reception of frames via the communication port 13C, as the content of setting change in the relay process of the transfer control unit 10, and outputs, to the transfer control unit 10, determination information indicating that reception of frames via the communication port 13C should be stopped.

Upon receiving the determination information from the transfer management unit 20, the transfer control unit 10, according to the received determination information, performs setting to stop reception of frames from the automated driving ECU 111C via the communication port 13C, such as cutting electrical connection between the communication port 13C and the internal circuit.

(Third Example of Setting Change)

For example, the transfer management unit 20 performs detection for abnormality of a target frame, and performs determination regarding setting change in the relay process of the transfer control unit 10 on the basis of the detection result.

More specifically, on the basis of information stored in the field of TTL in Entries Array of a target frame, e.g., a service provision frame, received from the transfer control unit 10, the transfer management unit 20 detects, as abnormality of the target frame, that a validity period of a service from a server ECU to a client ECU has expired.

The transfer management unit 20 recognizes that the validity period of the service from the server ECU to the client ECU has expired, on the basis of the TTL in the service provision frame received from the transfer control unit 10.

Specifically, when the transfer management unit 20 has recognized that the validity period of the service from the vehicle speed sensor 111A to the automated driving ECU 111C has expired, on the basis of the TTL in the service provision frame addressed to the automated driving ECU 111C from the vehicle speed sensor 111A, the transfer management unit 20 determines to reduce the shaping rate at the time of relaying a frame from the communication port 13A to the communication port 13C, by 30 Mbps, as the content of setting change in the relay process of the transfer control unit 10.

Then, the transfer management unit 20 outputs, to the transfer control unit 10, determination information indicating that the shaping rate at the time of relaying a frame from the communication port 13A to the communication port 13C should be reduced by 30 Mbps.

Upon receiving the determination information from the transfer management unit 20, the transfer control unit 10, according to the received determination information, changes the shaping rate at the time of relaying a frame from the communication port 13A to the communication port 13C, to 1 Mbps on the setting table in the storage unit 30 as shown in FIG. 6.

The transfer management unit 20 may be configured to determine the driving status of the vehicle 1 on the basis of the content of the information for starting provision of the service related to the communication setting frame, and perform determination regarding setting change in the relay process of the transfer control unit 10 on the basis of the determination result of the driving status of the vehicle 1.

More specifically, upon recognizing that the validity period of the service from the vehicle speed sensor 111A as the server ECU to the automated driving ECU 111C as the client ECU has expired, the transfer management unit 20 determines that the driving status of the vehicle 1 is changed from automated driving to manual driving. Then, based on the determination result, the transfer management unit 20 changes the shaping rate at the time of relaying a frame from the communication port 13A to the communication port 13C, to a preset shaping rate in a manual driving mode. Thus, the setting change in the relay process being performed according to the driving status of the vehicle 1 enables more efficient relay of frames.

The transfer management unit 20 performs determination regarding setting change in the relay process of the transfer control unit 10 in accordance with at least one of the aforementioned first to third examples of setting change.

(Notification to Function Unit)

For example, the transfer management unit 20 notifies at least one of a function unit as a provision source of a service related to a communication setting frame and a function unit as a provision destination of the service related to the communication setting frame, of information based on the result of the determination regarding the setting change in the relay process of the transfer control unit 10, via the transfer control unit 10.

More specifically, after a predetermined time has elapsed from when the determination information was outputted to the transfer control unit 10, the transfer management unit 20 outputs, to the transfer control unit 10, a setting content request for inquiring the transfer control unit 10 about the current setting content of the relay process.

Upon receiving the setting content request from the transfer management unit 20, the transfer control unit 10 outputs, to the transfer management unit 20, setting information indicating the current setting content of the relay process. Specifically, for example, the transfer control unit 10 acquires the setting table stored in the storage unit 30, and outputs, to the transfer management unit 20, setting information indicating the content of the acquired setting table.

Upon receiving the setting information from the transfer control unit 10, the transfer management unit 20 confirms whether or not the setting content of the relay process has been changed according to the content determined by itself, on the basis of the received setting information and the determination information outputted from itself.

The transfer management unit 20 confirms that the setting content of the relay process has been changed according to the content determined by itself, and transmits change completion information indicating the determined content and indicating that the setting content of the relay process has been changed according to the determined content, to the server ECU and the client ECU via the transfer control unit 10.

For example, the vehicle speed sensor 111A as the server ECU receives the change completion information from the transfer management unit 20 via the transfer control unit 10, and starts transmission of speed information to the automated driving ECU 111C as the client ECU. For example, on the basis of the determined content indicated by the received change completion information, the vehicle speed sensor 111A sets transmission frequency of the speed information to the automated driving ECU 111C, and the amount of data of the speed information to be transmitted to the automated driving ECU 111C.

[Operation Flow]

Each of the devices in the in-vehicle communication system is provided with a computer including a memory. An arithmetic processing unit such as a CPU in the computer reads out, from the memory, a program including a part or all of steps in the flowchart and the sequence diagram described below, and executes the program. Programs of the plurality of devices can each be installed from outside. The programs of the plurality of devices are each distributed in a state of being stored in a storage medium.

Figure 8:
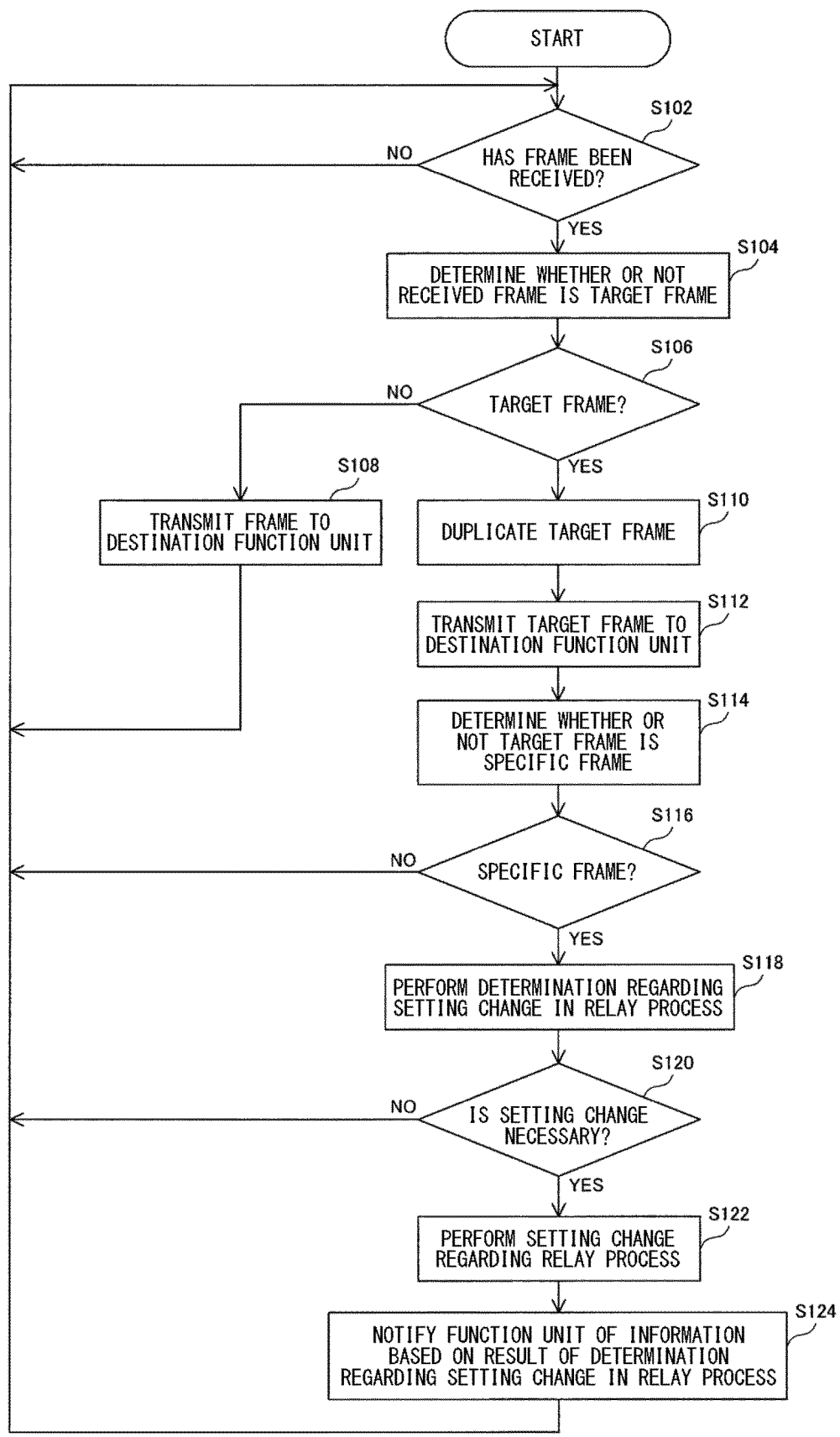
FIG. 8 is a flowchart showing an example of an operation procedure along which the relay device changes settings of a relay process in the in-vehicle communication system according to the embodiment of the present disclosure.

FIG. 8 is a flowchart showing an example of an operation procedure for changing setting of a relay process by the relay device in the in-vehicle communication system according to the embodiment of the present disclosure.

With reference to FIG. 8, firstly, the relay device 100 waits for a frame from a function unit, e.g., an in-vehicle ECU 111, in the in-vehicle network 12 (NO in step S102), receives a frame from an in-vehicle ECU 111 (YES in step S102), and determines whether or not the received frame is a target frame. More specifically, the relay device 100 confirms a port number in an UDP header of the received frame. If the port number of the frame matches a port number that is assigned in advance to a frame conforming to a predetermined communication protocol such as SOME/IP, the relay device 100 determines that the received frame is a target frame (step S104).

Upon determining that the received frame is not a target frame (NO in step S106), the relay device 100 transmits the frame to a destination function unit, e.g., in-vehicle ECU 111. That is, the relay device 100 relays the frame (step S108).

Next, the relay device 100 waits for a new frame from a function unit (NO in step S102).

Meanwhile, upon determining that the received frame is a target frame (YES in step S106), the relay device 100 duplicates the target frame (step S110).

Next, the relay device 100 transmits the target frame to a destination function unit, e.g., in-vehicle ECU 111. That is, the relay device 100 performs a relay process for the target frame (step S112).

Next, the relay device 100 determines whether or not the target frame is a specific frame such as a communication setting frame or a service provision frame. More specifically, the transfer control unit 10 in the relay device 100 outputs the duplicated target frame to the transfer management unit 20. For example, the transfer control unit 10 adds, to the duplicated target frame, port information indicating a communication port 13 through which the received target frame has been passed, and outputs the target frame to the transfer management unit 20. Then, the transfer management unit 20 determines whether or not the target frame is a specific frame on the basis of the information stored in the header of the target frame received from the transfer control unit 10 (step S114).

Upon determining that the target frame is not a specific frame (NO in step S116), the relay device 100 waits for a new frame from a function unit. More specifically, the transfer management unit 20 in the relay device 100 discards the target frame received from the transfer control unit 10 and waits for a new target frame from the transfer control unit 10 (NO in step S102).

Meanwhile, upon determining that the target frame is a specific frame (YES in step S116), the relay device 100 performs determination regarding setting change in the relay process on the basis of the information included in the target frame. More specifically, for example, the transfer management unit 20 in the relay device 100 performs determination as to whether or not setting change in the relay process of the transfer control unit 10 is necessary, and determination regarding the content of setting change, on the basis of the information stored in a header of a service subscription propriety frame or a service provision frame. Alternatively, the transfer management unit 20 confirms the reception frequency of a service search frame via a certain communication port 13 on the basis of the port information included in the target frame received from the transfer control unit 10. Then, on the basis of the confirmation result, the transfer management unit 20 performs determination as to whether or not setting change in the relay process of the transfer control unit 10 is necessary, and determination regarding the content of setting change (step S118).

Upon determining that setting change in the relay process is not necessary (NO in step S120), the relay device 100 waits for a new frame from a function unit. More specifically, the transfer management unit 20 in the relay device 100 discards the target frame received from the transfer control unit 10 and waits for a new target frame from the transfer control unit 10 (NO in step S102).

Meanwhile, upon determining that setting change in the relay process is necessary (YES in step S120), the relay device 100 performs setting change in the relay process. More specifically, the transfer management unit 20 in the relay device 100 determines the content of setting change in the relay process of the transfer control unit 10, and notifies the transfer control unit 10 of the determined content. The transfer control unit 10 performs the setting change in the relay process, according to the determined content notified from the transfer management unit 20 (step S122).

Upon completion of the setting change in the relay process, the relay device 100 notifies the function unit as the provision source of the service related to the target frame and the function unit as the provision destination of the service related to the target frame, of information based on the result of the determination regarding the setting change in the relay process. More specifically, the transfer management unit 20 in the relay device 100 confirms that the setting content of the relay process has been changed according to the determined content notified to the transfer control unit 10 by itself, and transmits, to each function unit via the transfer control unit 10, change completion information indicating the determined content and indicating that the setting content of the relay process has been changed according to the determined content (step S124).

Figure 9:
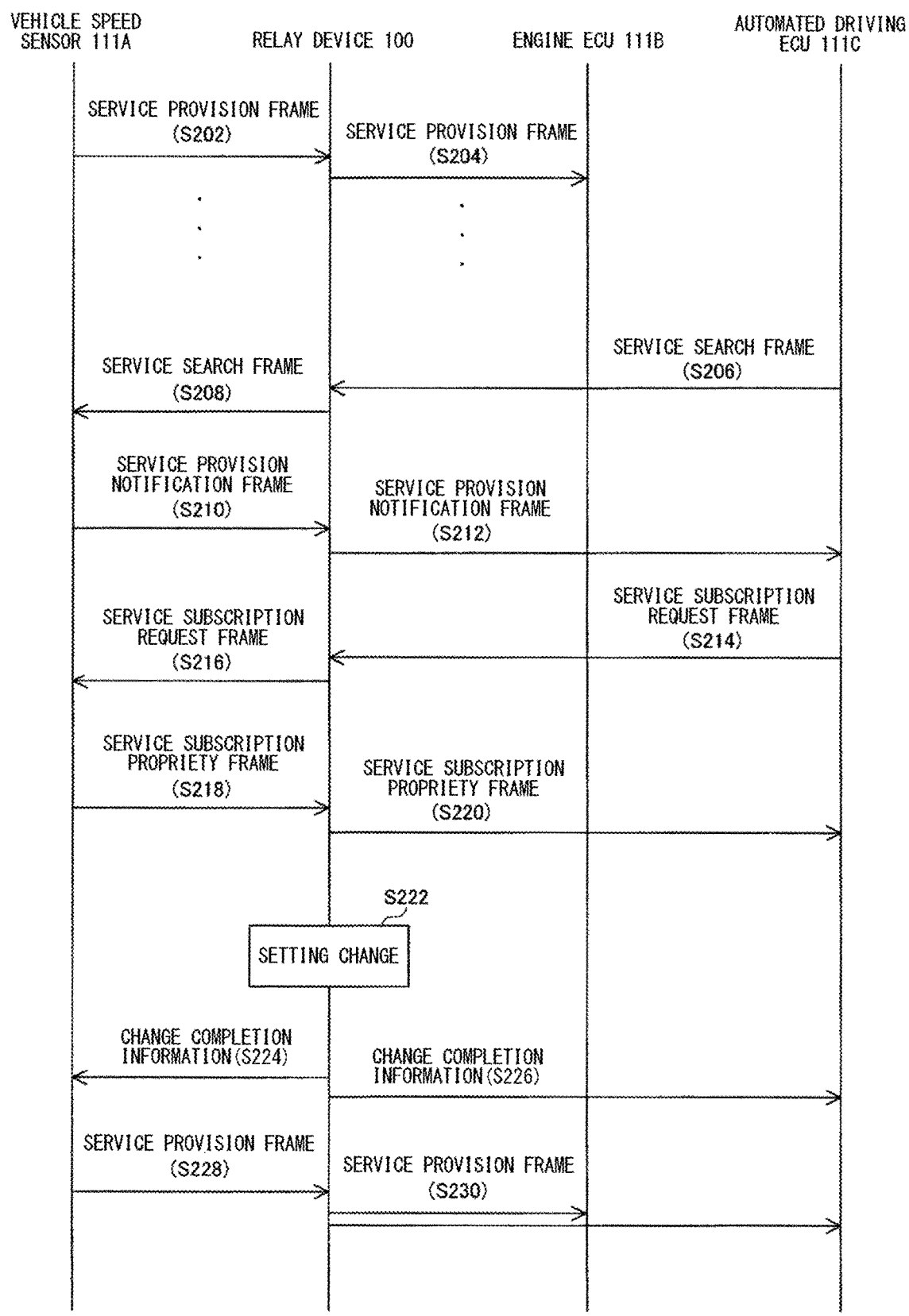
FIG. 9 shows an example of a sequence of a process for changing settings of a relay process for frames transmitted and received between function units in the in-vehicle communication system according to the embodiment of the present disclosure.

FIG. 9 shows an example of a sequence of a process for changing settings of a relay process for frames transmitted and received between the function units in the in-vehicle communication system according to the embodiment of the present disclosure. FIG. 9 shows a state where the vehicle speed sensor 111A as a server ECU provides a service to the engine ECU 111B as a client ECU.

With reference to FIG. 9, the vehicle speed sensor 111A which is an example of a function unit transmits, to the relay device 100, a service provision frame that includes speed information and is addressed to the engine ECU 111B, at a timing to transmit the speed information (step S202).

Next, the relay device 100 receives the service provision frame from the vehicle speed sensor 111A, and transmits the received service provision frame to the engine ECU 111B which is an example of a function unit. That is, the relay device 100 relays the service provision frame from the vehicle speed sensor 111A to the engine ECU 111B (step S204).

Next, the automated driving ECU 111C which is an example of a function unit transmits a service search frame which is an example of the communication setting frame to the relay device 100 (step S206).

Next, the relay device 100 relays the service search frame received from the automated driving ECU 111C, to another in-vehicle ECU 111, e.g., the vehicle speed sensor 111A (step S208).

Next, the vehicle speed sensor 111A transmits, as a response to the service search frame, a service provision notification frame which is an example of the communication setting frame to the relay device 100 (step S210).

Next, the relay device 100 relays the service provision notification frame received from the vehicle speed sensor 111A, to the automated driving ECU 111C (step S212).

Next, the automated driving ECU 111C transmits a service subscription request frame which is an example of the communication setting frame to the relay device 100 (step S214).

Next, the relay device 100 relays the service subscription request frame received from the automated driving ECU 111C, to the vehicle speed sensor 111A (step S216).

Next, the vehicle speed sensor 111A transmits, as a response to the service subscription request, a service subscription propriety frame which is an example of a communication setting frame and in which information indicating that service subscription is allowed is stored, to the relay device 100 (step S218).

Next, the relay device 100 duplicates the service subscription propriety frame received from the vehicle speed sensor 111A, and relays the duplicated service subscription propriety frame to the automated driving ECU 111C (step S220).

Next, the relay device 100 performs determination as to whether or not setting change in the relay process is necessary, and determination regarding the content of setting change, on the basis of the information stored in the header of the duplicated service subscription propriety frame, and performs setting change according to the determination result (step S222).

Upon completion of the setting change in the relay process, the relay device 100 transmits a frame including change completion information to the vehicle speed sensor 111A (step S224).

Also, the relay device 100 transmits the frame including the change completion information to the automated driving ECU 111C (step S226).

Next, the vehicle speed sensor 111A transmits a service provision frame addressed to the engine ECU 111B and the automated driving ECU 111C, to the relay device 100, at a next transmission timing for transmitting the speed information (step S228).

Next, the relay device 100 receives the service provision frame from the vehicle speed sensor 111A, and transmits the received service provision frame to the engine ECU 111B and the automated driving ECU 111C (step S230).

Figure 10:
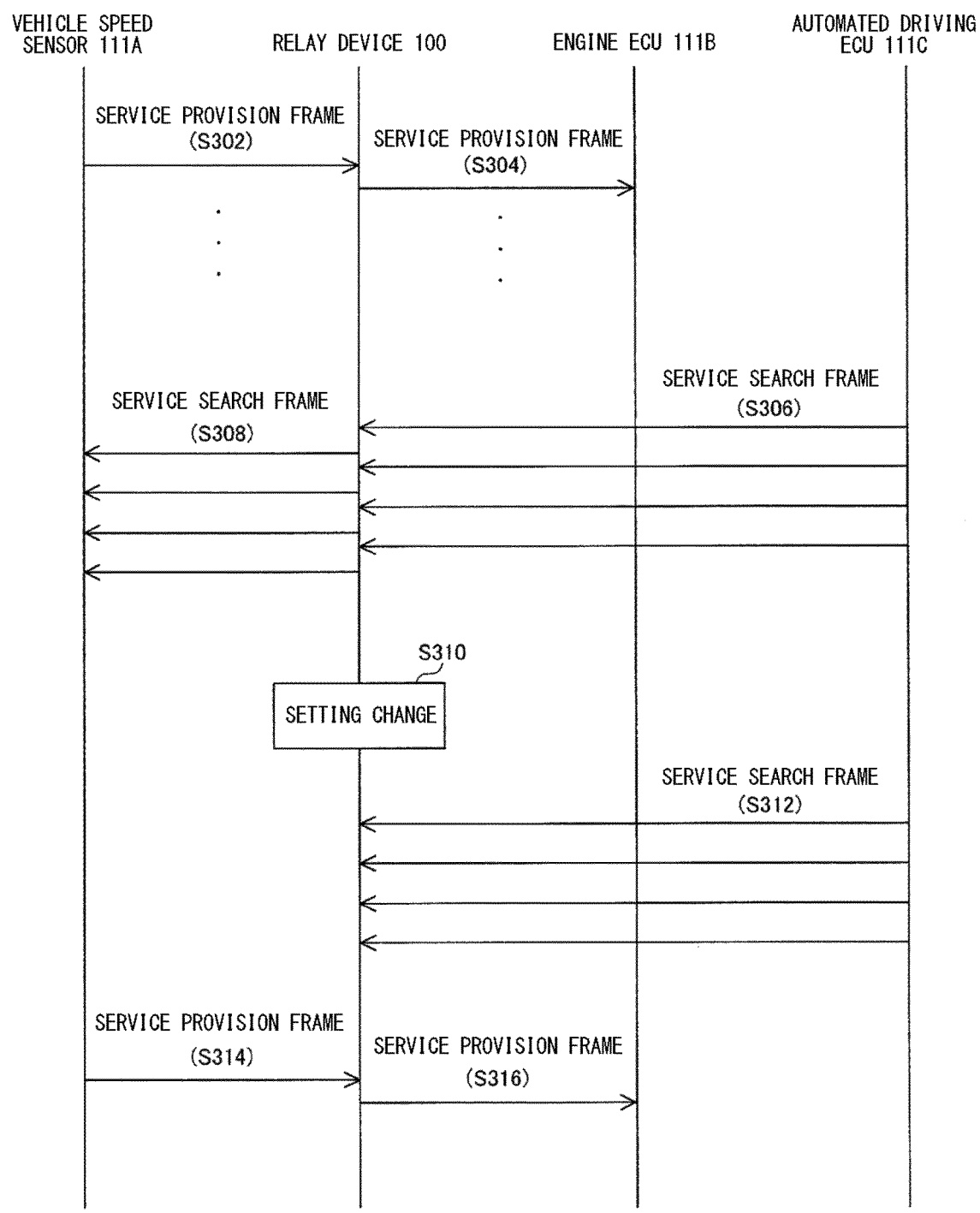
FIG. 10 shows another example of a sequence of a process for changing settings of a relay process for frames transmitted and received between function units in the in-vehicle communication system according to the embodiment of the present disclosure.

FIG. 10 shows another example of a sequence of a process for changing settings of a relay process for frames transmitted and received between the function units in the in-vehicle communication system according to the embodiment of the present disclosure. FIG. 10 shows a state where the vehicle speed sensor 111A as a server ECU provides a service to the engine ECU 111B as a client ECU.

With reference to FIG. 10, the vehicle speed sensor 111A which is an example of a function unit transmits, to the relay device 100, a service provision frame that includes speed information and is addressed to the engine ECU 111B, at a timing to transmit the speed information (step S302).

Next, the relay device 100 receives the service provision frame from the vehicle speed sensor 111A, and transmits the received service provision frame to the engine ECU 111B which is an example of a function unit. That is, the relay device 100 relays the service provision frame from the vehicle speed sensor 111A to the engine ECU 111B (step S304).

Next, the automated driving ECU 111C which is an example of a function unit repeatedly transmits a service search frame which is an example of the communication setting frame to the relay device 100 (step S306).

Next, the relay device 100 relays the service search frame received from the automated driving ECU 111C to another in-vehicle ECU 111, e.g., the vehicle speed sensor 111A (step S308).

When the reception frequency of the service search frame from the automated driving ECU 111C is equal to or higher than a predetermined value, the relay device 100 determines to stop the relay process for frames from the automated driving ECU 111C to the vehicle speed sensor 111A, as determination regarding setting change in the relay process, and performs setting change to stop reception of frames via the communication port 13C (step S310).

Next, the automated driving ECU 111C repeatedly transmits the service search frame to the relay device 100. Meanwhile, the relay device 100 does not receive the service search frame from the automated driving ECU 111C after the setting change to stop reception of frames via the communication port 13C (step S312).

Next, the vehicle speed sensor 111A transmits a service provision frame addressed to the engine ECU 111B, to the relay device 100 at a next timing to transmit the speed information (step S314).

Next, the relay device 100 receives the service provision frame from the vehicle speed sensor 111A, and transmits the received service provision frame to the engine ECU 111B (step S316).

Modifications

Figure 11:
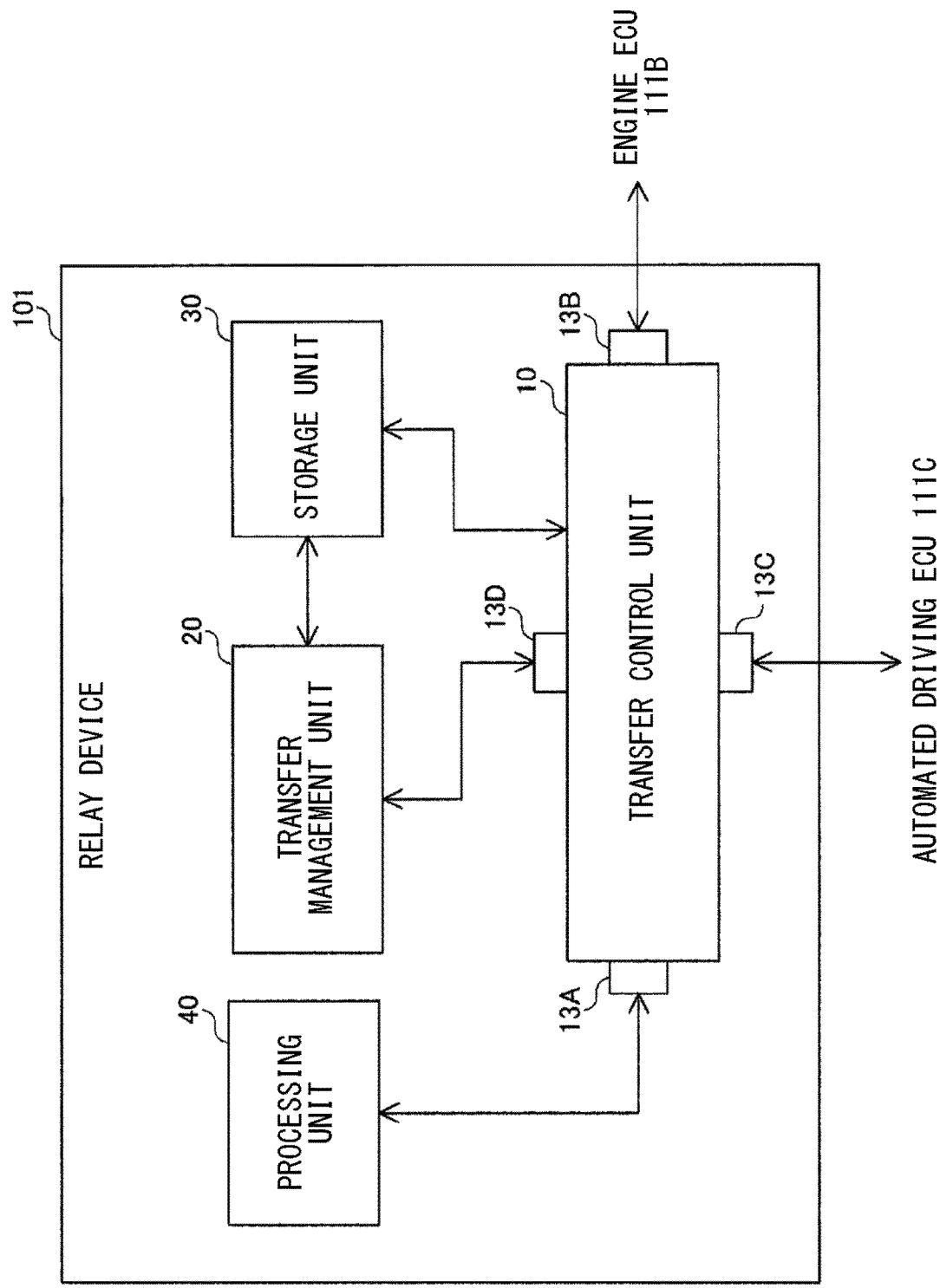
FIG. 11 shows a configuration of a modification of the relay device according to the embodiment of the present disclosure.

FIG. 11 shows a configuration of a modification of the relay device according to the embodiment of the present disclosure.

With reference to FIG. 11, the relay device 101 includes a transfer control unit 10, a transfer management unit 20, a storage unit 30, and a processing unit 40.

The processing unit 40 is an example of a function unit in the in-vehicle network 12. The processing unit 40 is connected to the communication port 13A of the transfer control unit 10. For example, the processing unit 40 acquires information such as speed information from an in-vehicle ECU 111 in the in-vehicle network 12, and transmits the acquired information to another in-vehicle ECU 111.

The processing unit 40 transmits and receives, via the transfer control unit 10, a communication setting frame, conforming to SOME/IP, for establishing communication connection with an in-vehicle ECU 111.

For example, the processing unit 40 functions as a server, establishes communication connection with a client ECU, and starts provision of a service to the client ECU by using the frame conforming to SOME/IP. Specifically, the processing unit 40 periodically or non-periodically transmits a service provision frame including information such as speed information, to the in-vehicle ECU 111 via the transfer control unit 10.

Meanwhile, the processing unit 40 functions as a client, establishes communication connection with a server ECU, and receives provision of a service from the server ECU by using the frame conforming to SOME/IP. Specifically, the processing unit 40 periodically or non-periodically receives a service provision frame including information such as speed information, from the in-vehicle ECU 111 via the transfer control unit 10.

The transfer control unit 10 performs a relay process for frames transmitted and received between the processing unit 40 and the in-vehicle ECUs 111.

For example, the transfer control unit 10 receives a specific target frame such as a communication setting frame or a service provision frame from the processing unit 40, duplicates a part or the entirety of the received target frame, relays the duplicated target frame to the in-vehicle ECU 111, and outputs the duplicated target frame to the transfer management unit 20. Meanwhile, the transfer control unit 10 receives a specific target frame such as a communication setting frame or a service provision frame from an in-vehicle ECU 111, duplicates a part or the entirety of the received target frame, relays the duplicated target frame to the processing unit 40, and outputs the duplicated target frame to the transfer management unit 20.

Other Modifications

In the relay device 100 according to the embodiment of the present disclosure, the transfer control unit 10 is configured to output port information to the transfer management unit 20. However, the present disclosure is not limited thereto. The transfer control unit 10 may be configured not to output port information to the transfer management unit 20. Even in this case, the transfer management unit 20 can perform determination regarding setting change in the relay process according to the first or third example of setting change.

The transfer control unit 10 is configured to duplicate the entirety of a received target frame and output the duplicated target frame to the transfer management unit 20, that is, configured to add MAC-D as a destination MAC address of the received target frame and output the target frame to the transfer management unit 20 via the communication port 13D. However, the present disclosure is not limited thereto. The transfer control unit 10 may be configured to duplicate target data which is a part of the received target frame and output the duplicated target data to the transfer management unit 20.

In the relay device 100 according to the embodiment of the present disclosure, the transfer management unit 20 is configured to perform determination regarding setting change in the relay process of the transfer control unit 10 on the basis of: the content of information for starting provision of a service related to a communication setting frame; and information regarding a function unit as a provision source of the service or information regarding a function unit as a provision destination of the service. However, the present disclosure is not limited thereto. The transfer management unit 20 may be configured to perform determination regarding setting change in the relay process of the transfer control unit 10 on the basis of only one of: the content of the information; and the information regarding the function unit as the provision source of the service or the function unit as the provision destination of the service.

In the relay device 100 according to the embodiment of the present disclosure, the transfer management unit 20 is configured to perform determination regarding the setting change in the relay process of the transfer control unit 10 on the basis of the content of a header of a target frame transmitted and received according to SOME/IP as a communication protocol. However, the present disclosure is not limited thereto. The transfer management unit 20 may be configured to perform determination regarding setting change in the relay process of the transfer control unit 10, on the basis of the content of a header of a frame transmitted and received according to a communication protocol other than SOME/IP.

In the relay device 100 according to the embodiment of the present disclosure, the transfer control unit 10 is configured to perform setting change in the relay process, upon receiving determination information from the transfer management unit 20. However, the present disclosure is not limited thereto. The transfer management unit 20 may determine not to perform setting change in the relay process. In this case, for example, the transfer management unit 20 transmits determination information to a function unit via the transfer control unit 10. The function unit performs setting change regarding transmission of information to another function unit, according to the determination information received from the transfer management unit 20.

In the relay device 100 according to the embodiment of the present disclosure, the transfer control unit 10 is configured to perform setting change in the relay process, according to the determined content stored in the storage unit 30, when the relay device 100 is started up. However, the present disclosure is not limited thereto. The transfer control unit 10 may be configured not to refer to the determined content stored in the storage unit 30, when the relay device 100 is started up.

The storage unit 30 may be a memory including a volatile storage region and a nonvolatile storage region. For example, in a case where the transfer control unit 10 has been stably operated for a predetermined period of time after changing a setting table in the volatile storage region of the storage unit 30 according to the determination information received from the transfer management unit 20, the transfer control unit 10 stores the changed setting table in the nonvolatile storage region of the storage unit 30. Meanwhile, in a case where an ID of a function unit in the field of Request ID of a target frame is a predetermined ID, e.g., an ID of a function unit whose reliability is equal to or higher than a predetermined value, the transfer control unit 10 stores the changed setting table in the nonvolatile storage region of the storage unit 30.

In the relay device 100 according to the embodiment of the present disclosure, the transfer management unit 20 is configured to notify a function unit, e.g., an in-vehicle ECU 111, of change completion information via the transfer control unit 10. However, the present disclosure is not limited thereto. The transfer management unit 20 may be configured not to notify the function unit of the change completion information.

Incidentally, a technology capable of more efficiently performing a relay process in an in-vehicle network is desired.

For example, in recent years, an in-vehicle network in which service-oriented communication is introduced has been promoted. A technology capable of, according to the communication status between function units performing such service-oriented communication, improving efficiency of a relay process for a frame transmitted and received between the function units and improving security of the communication between the function units, at reduced cost, is desired.

Meanwhile, in the relay device according to the embodiment of the present disclosure, the transfer control unit 10 performs a relay process for a frame transmitted and received between function units. The transfer control unit 10 receives, from a function unit, a target frame which is transmitted and received according to a predetermined communication protocol and includes information with which a request source of a service is identifiable and information with which the content of the requested service is identifiable. Then, the transfer control unit 10 duplicates target data which is at least a part of the received target frame, outputs the duplicated target data to the transfer management unit 20, and relays the received target frame to another function unit. The transfer management unit 20 performs determination regarding setting change in the relay process in the transfer control unit 10, on the basis of the target data received from the relay unit 10.

As described above, according to the configuration for performing determination regarding setting change in the relay process on the basis of the information included in the target frame, determination regarding setting change in the relay process for a frame between the function units can be performed according to the status of service-oriented communication between the function units, for example. Thus, it is possible to efficiently relay a frame transmitted and received between a function unit as a provision source of a service and a function unit as a provision destination of the service, for example.

Therefore, in the relay device according to the embodiment of the present disclosure, the relay process in the in-vehicle network can be performed more efficiently.

In the in-vehicle communication system 300 according to the embodiment of the present disclosure, the relay device 100 performs a relay process for a frame transmitted and received between function units. Each function unit transmits, to the relay device 100, a target frame which is transmitted and received according to a predetermined communication protocol and includes information with which a request source of a service is identifiable and information with which the content of the requested service is identifiable. The relay device 100 receives the target frame from the function unit, relays the received target frame to another function unit, and performs determination regarding setting change in the relay process, on the basis of the information included in the received target frame.

As described above, according to the configuration for performing determination regarding setting change in the relay process on the basis of the information included in the target frame, determination regarding setting change in the relay process for a frame between the function units can be performed according to the status of service-oriented communication between the function units, for example. Thus, it is possible to efficiently relay a frame transmitted and received between a function unit as a provision source of a service and a function unit as a provision destination of the service, for example.

Therefore, in the in-vehicle communication system according to the embodiment of the present disclosure, the relay process in the in-vehicle network can be performed more efficiently.

An in-vehicle communication method according to the embodiment of the present disclosure is a method performed by the relay device 100 used in the in-vehicle network 12 including a plurality of function units. In the in-vehicle communication method, firstly, the relay device 100 performs a relay process for a frame transmitted and received between the function units. Next, the relay device 100 performs determination regarding setting change in the relay process. In performing the relay process for the frame, the relay device 100 receives, from a function unit, a target frame which is transmitted and received according to a predetermined communication protocol and includes information with which a request source of a service is identifiable and information with which the content of the requested service is identifiable, and the relay device 100 relays the received target frame to another function unit. In performing the determination regarding the setting change, the relay device 100 performs the determination regarding the setting change in the relay process, on the basis of the information included in the received target frame.

According to the method for performing determination regarding setting change in the relay process on the basis of the information included in the target frame, the determination regarding setting change in the relay process for a frame between the function units can be performed according to the status of service-oriented communication between the function units. Thus, for example, it is possible to efficiently relay a frame transmitted and received between a function unit as a provision source of a service and a function unit as a provision destination of the service.

Therefore, in the in-vehicle communication method according to the embodiment of the present disclosure, the relay process in the in-vehicle network can be performed more efficiently.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A relay device used in an in-vehicle network including a plurality of function units, including:
  a transfer control unit configured to perform a relay process for a frame transmitted and received between the function units; and
  a transfer management unit, wherein
  the transfer control unit
    receives, from a function unit, a target frame which is transmitted and received according to SOME/IP as a communication protocol and includes information with which a request source of a service is identifiable and information with which a content of the requested service is identifiable,
    duplicates target data which is at least a part of the received target frame,
    outputs the duplicated target data to the transfer management unit, and
    relays the received target frame to another function unit, and
  the transfer management unit performs determination regarding setting change in the relay process in the transfer control unit, on the basis of at least either of data included in a communication setting frame for establishing communication connection between the function units and data included in a service provision frame for providing the service from a function unit as a provision source of the service, from among the target data received from the transfer control unit.

[Additional Note 2]

An in-vehicle communication system including:
  a plurality of function units; and
  a relay device, wherein
  the relay device performs a relay process for a frame transmitted and received between the function units,
  each function unit transmits, to the relay device, a target frame which is transmitted and received according to a predetermined communication protocol and includes information with which a request source of a service is identifiable and information with which a content of the requested service is identifiable,
  the relay device receives the target frame from the function unit, relays the received target frame to another function unit, and performs determination regarding setting change in the relay process, on the basis of the information included in the received target frame,
  the relay device notifies a function unit as a provision source of the service related to the target frame and a function unit as a provision destination of the service related to the target frame, of information based on a result of the determination regarding the setting change, and
  the function unit as the provision source of the service related to the target frame starts provision of the service to the function unit as the provision destination of the service related to the target frame, on the basis of the information notified from the relay device.

[Additional Note 3]

A relay device which includes a processor and a semiconductor integrated circuit, and is used in an in-vehicle network including a plurality of function units,
  the semiconductor integrated circuit implementing a transfer control unit configured to perform a relay process for a frame transmitted and received between the function units,
  the processor implementing a transfer management unit, wherein
  the transfer control unit
    receives, from a function unit, a target frame which is transmitted and received according to a predetermined communication protocol and includes information with which a request source of a service is identifiable and information with which a content of the requested service is identifiable,
    duplicates target data which is at least a part of the received target frame,
    outputs the duplicated target data to the transfer management unit, and
    relays the received target frame to another function unit, and
  the transfer management unit performs determination regarding setting change in the relay process in the transfer control unit, on the basis of the target data received from the transfer control unit.

[Additional Note 4]

An in-vehicle communication system, including:
  a plurality of in-vehicle ECUs; and
  a relay device, wherein
  the relay device performs a relay process for a frame transmitted and received between the in-vehicle ECUs,
  each in-vehicle ECU transmits, to the relay device, a target frame which is transmitted and received according to a predetermined communication protocol and includes information with which a request source of a service is identifiable and information with which a content of the requested service is identifiable, and the relay device receives the target frame from the in-vehicle ECU, relays the received target frame to another in-vehicle ECU, and performs determination regarding setting change in the relay process, on the basis of the information included in the received target frame.

[Additional Note 5]

A relay device used in an in-vehicle network including a plurality of function units, the relay device including:

a relay unit configured to perform a relay process for a frame transmitted and received between the function units; and a relay management unit, wherein the relay unit receives, from a function unit, a target frame which is transmitted and received according to a predetermined communication protocol and includes information with which a request source of a service is identifiable and information with which a content of the requested service is identifiable, duplicates target data which is at least a part of the received target frame, outputs the duplicated target data to the relay management unit, and relays the received target frame to another function unit, and the relay management unit determines a driving status of a vehicle on the basis of the target data received from the relay unit, and performs determination regarding setting change in the relay process in the relay unit, on the basis of a determination result of the driving status of the vehicle.

REFERENCE SIGNS LIST 1 vehicle
10 transfer control unit
11 Ethernet cable
12 in-vehicle network
13 communication port
20 transfer management unit
30 storage unit
40 processing unit
100 relay device
101 relay device
111A vehicle speed sensor (in-vehicle ECU)
111B engine ECU (in-vehicle ECU)
111C automated driving ECU (in-vehicle ECU)
112 application
300 in-vehicle communication system

The invention claimed is:

1. A relay device used in an in-vehicle network including a plurality of function units, the relay device comprising:

a relay unit to perform a relay process for a frame transmitted and received between the function units; and a relay management unit, wherein the relay unit receives, from a function unit, a target frame which is transmitted and received according to a predetermined communication protocol and includes information with which a request source of a service is identifiable and information with which a content of the requested service is identifiable, duplicates target data which is at least a part of the received target frame, outputs the duplicated target data to the relay management unit, and relays the received target frame to another function unit without modifying the received target frame, and the relay management unit performs determination regarding setting change in the relay process of the relay unit, on the basis of the target data received from the relay unit, and the setting change in the relay process includes at least one of:

a) changing a communication band when relaying the frame from a first communication port that received the target frame to a second communication port that sent the target frame, or b) stopping reception of the frame at the first communication port.

2. The relay device according to claim 1, wherein the relay unit outputs, to the relay management unit, port information indicating a communication port through which the received target frame has been passed, among a plurality of communication ports included in the relay device, and the relay management unit performs the determination regarding the setting change further on the basis of the port information received from the relay unit.

3. The relay device according to claim 1, wherein the relay management unit performs the determination regarding the setting change, on the basis of information regarding a function unit as a provision source of a service related to the target frame or information regarding a function unit as a provision destination of the service related to the target frame.

4. The relay device according to claim 1, wherein the relay management unit performs the determination regarding the setting change, on the basis of a content of information for starting provision of a service related to the target frame.

5. The relay device according to claim 1, wherein the relay management unit performs detection for abnormality of the target frame, and performs the determination regarding the setting change on the basis of a result of the detection.

6. The relay device according to claim 1, wherein the relay management unit performs the determination regarding the setting change, on the basis of a content of a header of the target frame transmitted and received according to SOME/IP (Scalable Service-Oriented Middleware on Ethernet/Internet Protocol) as a communication protocol.

7. The relay device according to claim 1, wherein the relay management unit determines a content of the setting change, and notifies the relay unit of the determined content, and the relay unit performs the setting change in the relay process, according to the determined content notified from the relay management unit.

8. The relay device according to claim 7, further comprising a storage to store therein the determined content in a non-volatile manner, wherein the relay unit performs the setting change in the relay process, according to the determined content in the unit when the relay device is started up.

9. The relay device according to claim 1, wherein the relay management unit notifies at least one of a function unit as a provision source of the service related to the target frame and a function unit as a provision destination of the service related to the target frame, of information based on a result of the determination regarding the setting change, via the relay unit.

10. An in-vehicle communication system, comprising:
a plurality of function structures units; and
a relay, wherein
the relay performs a relay process for a frame transmitted and received between the function units,
each function unit transmits, to the relay, a target frame which is transmitted and received according to a predetermined communication protocol and includes information with which a request source of a service is identifiable and information with which a content of the requested service is identifiable, and
the relay receives the target frame from the function unit, relays the received target frame to another function unit without modifying the received target frame, and performs determination regarding setting change in the relay process, on the basis of the information included in the received target frame, and
the setting change in the relay process includes at least one of:
a) changing a communication band when relaying the frame from a first communication port that received the target frame to a second communication port that sent the target frame, or
b) stopping reception of the frame at the first communication port.

11. An in-vehicle communication method performed by a relay used in an in-vehicle network including a plurality of function units, the method comprising:
performing a relay process for a frame transmitted and received between the function units; and
performing determination regarding setting change in the relay process, wherein
in performing the relay process for the frame, a target frame, which is transmitted and received according to a predetermined communication protocol and includes information with which a request source of a service is identifiable and information with which a content of the requested service is identifiable, is received from a function unit, and the received target frame is relayed to another function unit without modifying the received target frame, and
in performing the determination regarding the setting change, the determination regarding the setting change in the relay process is performed on the basis of the information included in the received target frame, and
the setting change in the relay process includes at least one of:
a) changing a communication band when relaying the frame from a first communication port that received the target frame to a second communication port that sent the target frame, or
b) stopping reception of the frame at the first communication port.

12. A non-transitory computer-readable storage medium having, stored therein, a computer program to be used in a relay used in an in-vehicle network including a plurality of function units, the computer program being for causing a computer to function as:
a relay unit to perform a relay process for a frame transmitted and received between the function structures units; and
a relay management unit, wherein
the relay unit
receives, from a function unit, a target frame which is transmitted and received according to a predetermined communication protocol and includes information with which a request source of a service is identifiable and information with which a content of the requested service is identifiable,
duplicates target data which is at least a part of the received target frame,
outputs the duplicated target data to the relay management unit, and
relays the received target frame to another function unit without modifying the received target frame, and
the relay management unit performs determination regarding setting change in the relay process of the relay unit, on the basis of the target data received from the relay unit, and
the setting change in the relay process includes at least one of:
a) changing a communication band when relaying the frame from a first communication port that received the target frame to a second communication port that sent the target frame, or
b) stopping reception of the frame at the first communication port.

\* \* \* \* \*